(12) United States Patent
Hofmann

(10) Patent No.: US 7,207,791 B2
(45) Date of Patent: *Apr. 24, 2007

(54) DEVICE FOR THE PRODUCTION OF TRANSVERSELY RIBBED PIPES

(75) Inventor: Gunther Hofmann, Hassfurt (DE)

(73) Assignee: Unicor GmbH Rahn Plastmaschinen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/536,489

(22) PCT Filed: Dec. 2, 2003

(86) PCT No.: PCT/DE03/03962

§ 371 (c)(1),
(2), (4) Date: May 25, 2005

(87) PCT Pub. No.: WO2004/052625

PCT Pub. Date: Jun. 24, 2004

(65) Prior Publication Data

US 2006/0134256 A1 Jun. 22, 2006

(30) Foreign Application Priority Data

Dec. 9, 2002 (DE) ............................... 102 57 365

(51) Int. Cl.
*B29C 47/90* (2006.01)

(52) U.S. Cl. .................... 425/336; 425/107; 425/326.1; 425/369; 425/392; 425/396

(58) Field of Classification Search ................ 425/107, 425/233, 325, 326.1, 336, 369, 387.1, 388, 425/392, 396
See application file for complete search history.

(56) References Cited

U.S. PATENT DOCUMENTS 3,280,430 A 10/1966 Antrobus (Continued)

FOREIGN PATENT DOCUMENTS

DE 3118932 C3 2/1995

(Continued)

OTHER PUBLICATIONS

Fluidic Muscle Type MAS- . . . (Festo MAS- . . . 0010NH—Deutsch).

*Primary Examiner*—Robert Davis
*Assistant Examiner*—Joseph Leyson
(74) *Attorney, Agent, or Firm*—Fulbright & Jaworski LLP; Jan K. Simpson

(57) ABSTRACT

Described is an apparatus for the production of transversely ribbed tubes comprising mold jaw halves which are movable in a condition of bearing against each other along two guide. The guide paths have a common mold section, a respective return section and two respective direction-changing sections. The respective direction-changing section has a direction-changing member which is linearly movably guidedly arranged on a base element fixed with respect to the machine and which is connected to a compensating device which is provided to compensate for the tolerance play of the mold jaw halves which circulate along the associated guide path, said tolerance play being dependent on the temperature and/or the speed of the mold jaw halves.

3 Claims, 3 Drawing Sheets

Figure 1:
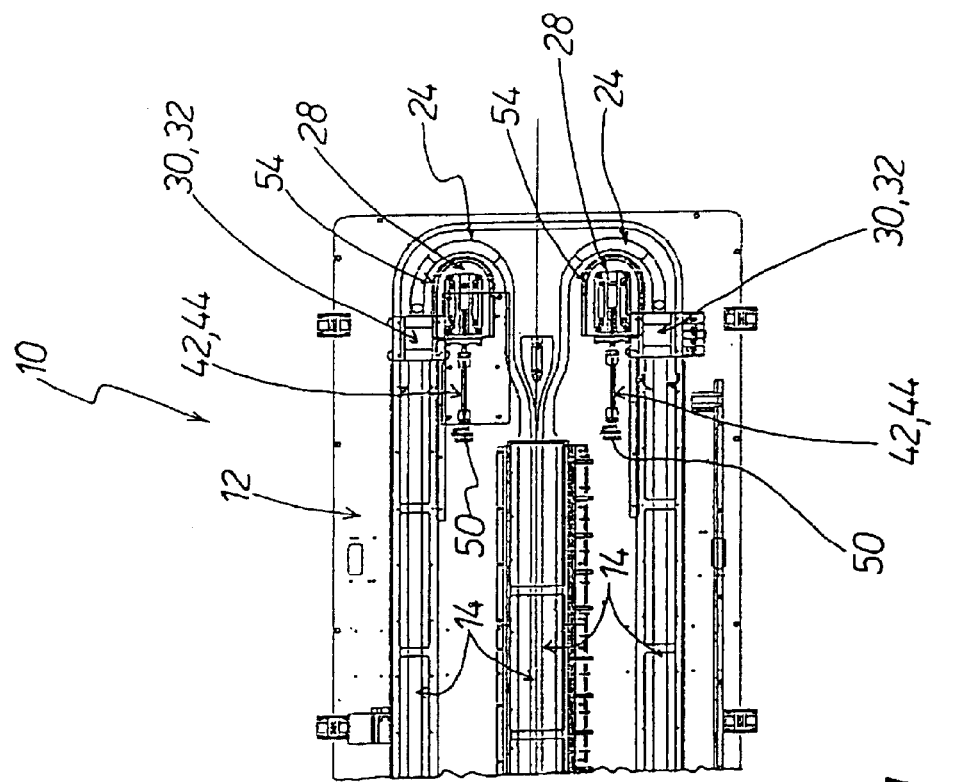
Figure 1:
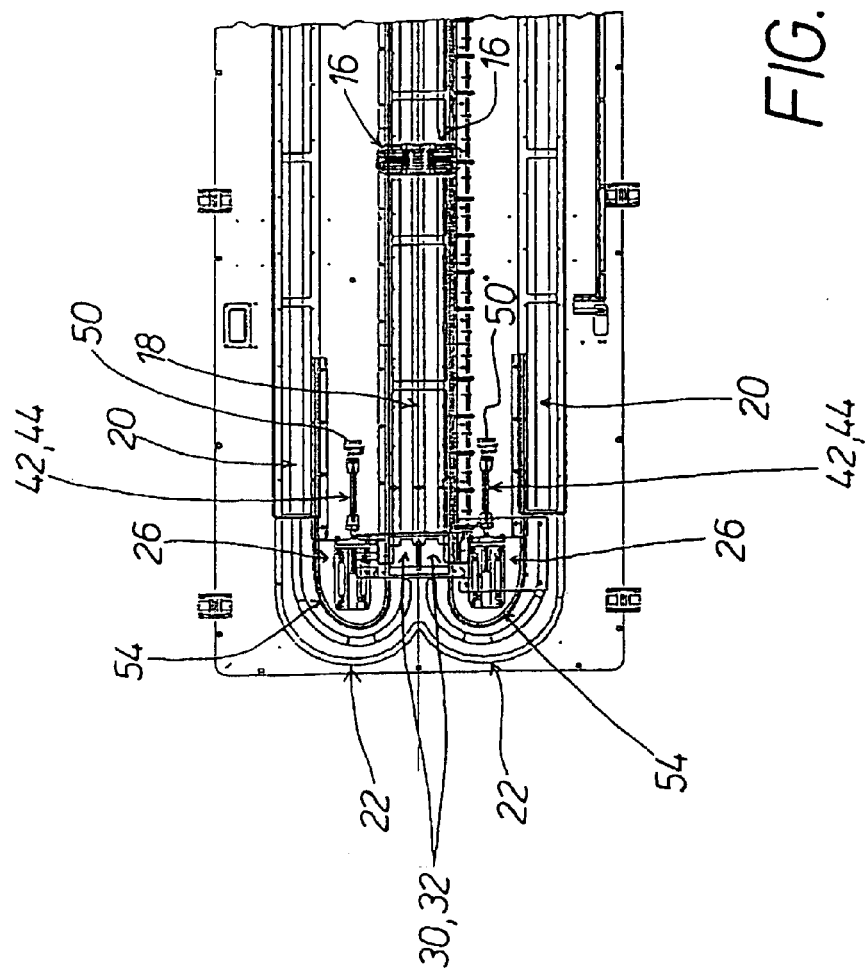

U.S. PATENT DOCUMENTS 3,776,679 A * 12/1973 Hegler .................. 425/396
4,439,130 A *  3/1984 Dickhut et al. ......... 425/388
4,725,221 A     2/1988 Blanz
4,824,354 A     4/1989 Keaton
5,111,735 A *  5/1992 Johnson ................. 91/433
6,206,670 B1 *  3/2001 Neubauer ............... 425/326.1
6,457,965 B1 * 10/2002 Hegler .................. 425/233

FOREIGN PATENT DOCUMENTS

DE          19619429 A1    12/1997

* cited by examiner

DEVICE FOR THE PRODUCTION OF TRANSVERSELY RIBBED PIPES

The invention concerns an apparatus for the production of transversely ribbed tubes, comprising mold jaw halves which are circulatingly movable in a condition of bearing against each other along two guide paths by means of a respective associated drive device, wherein the two guide paths have a common mold section, a respective return section and two respective direction-changing sections, wherein the respective direction-changing section has a direction-changing member provided with an arcuate guide edge for the mold law halves and is linearly movably guidedly arranged on a base element fixed with respect to the machine and is connected to a compensating device which can compensate for a tolerance play of the mold jaw halves which circulate along the associated guide path.

Apparatuses for the production of transversely ribbed tubes are known per se in a large number of configurations, they are usually referred to as corrugators.

In the known apparatuses of the general kind set forth, longitudinal expansion of the mold jaw halves, which is caused by the operating temperature, gives rise to the need to correspondingly lengthen the two guide paths in order to prevent the mold jaw halves from becoming jammed along the guide paths. That length adjustment of the two guide paths has hitherto been effected for example by manual displacement of the direction-changing members. That displacement requires personnel with a good level of skill. The apparatus is not in operation during the displacement procedure so that productivity is reduced.

An apparatus of the kind set forth in the opening part of this specification is known for example from DE 31 18 932 C2. In that known apparatus the mold jaw halves are mounted on chains which are guided around direction-changing wheels forming the direction-changing members. The direction-changing wheels have a circular periphery, and they are displaceable on a stationary machine frame structure in respect of height and transversely with respect to the advance direction, that is to say the production direction. That displacement is effected manually.

An apparatus of the kind set forth in the opening part of this specification is also known from U.S. Pat. No. 3,280,430. In that known apparatus adjustment of the direction-changing wheels is also effected by hand.

U.S. Pat. No. 4,824,354 discloses a hydraulic press having first and second mold jaws mounted to belts. The mold jaws are circulatingly movable along two endless guide paths by means of an associated drive device. The two guide paths form a common mold section. The direction-changing sections of the two mold sections each have a respective direction-changing member formed by a roller with a circular periphery. The direction-changing rollers are resiliently movably mounted to a support structure which is fixed with respect to the machine, in order to tension the belts and to compensate for temperature-dependent and/or speed-dependent tolerances.

DE 196 19 429 A1 also discloses an apparatus of the kind set forth in the opening part of this specification. In that known apparatus the mold jaw halves which circulate along the respective guide path are connected together by means of connecting elements formed by tension springs. In the entry region into the mold section, the direction-charging members are provided with a guide edge which is not circular but approximately elliptical in order to prevent overlapping contact of the mold jaw halves at their edges.

The object of the invention is to provide an apparatus of the kind set forth in the opening part of this specification, which is of a simple design configuration, in which manual displacement of the direction-changing members for adaptation to the respective operating conditions is avoided, and which can be operated at a high level of productivity.

In accordance with the invention, in an apparatus of the kind set forth in the opening part of this specification, that object is attained in that the respective direction-changing member comprises a low-wear plastic material and the tolerance play is dependent on the temperature and/or the speed of the mold jaw halves, that the respective direction-changing member is provided with a clothold-like guide edge for the associated mold law halves and that the compensating device has an air spring which can be subjected to the action of compressed air.

The compensating device connected to the respective direction-changing member automatically compensates for any change in length of the mold jaw halves, which is caused by the operating temperature involved, insofar as the associated guide path is automatically adjusted for adaptation to said change in length. The compensating devices also serve at the same time automatically to compensate for, that is to say equalize out, influences, caused by speed, that is to say centrifugal force, of the mold jaw halves along the direction-changing members. The configuration of the apparatus, that is to say the combination of the direction-changing members which define the direction-changing sections, with the compensating devices, affords the advantage that manual adjustments of the direction-changing members for adaptation to changes in length of the mold jaw halves, caused by the operating temperature involved, are not required, that the influences of centrifugal force in respect of the mold jaw halves are compensated along the direction-changing members, and that the productivity of the apparatus is improved.

The fact that the respective direction-changing member has a clothold-like guide edge for the associated mold jaw halves prevents an unwanted jump movement at the transition between the respective direction-changing member and the straight mold section or the straight return section respectively, and in that way improves the productivity of the apparatus.

In accordance with the invention the compensating devices are formed by air springs which can be subjected to the action of compressed air. Such a compensating device is described for example in the company prospectus from Festo "Fluid Muscle Type MAS . . . " 0010NH.

It has proven to be desirable in the apparatus according to the invention if the respective direction-changing member comprises a low-wear plastic material which preferably involves a plastic material with oil inclusions.

Figure 2:
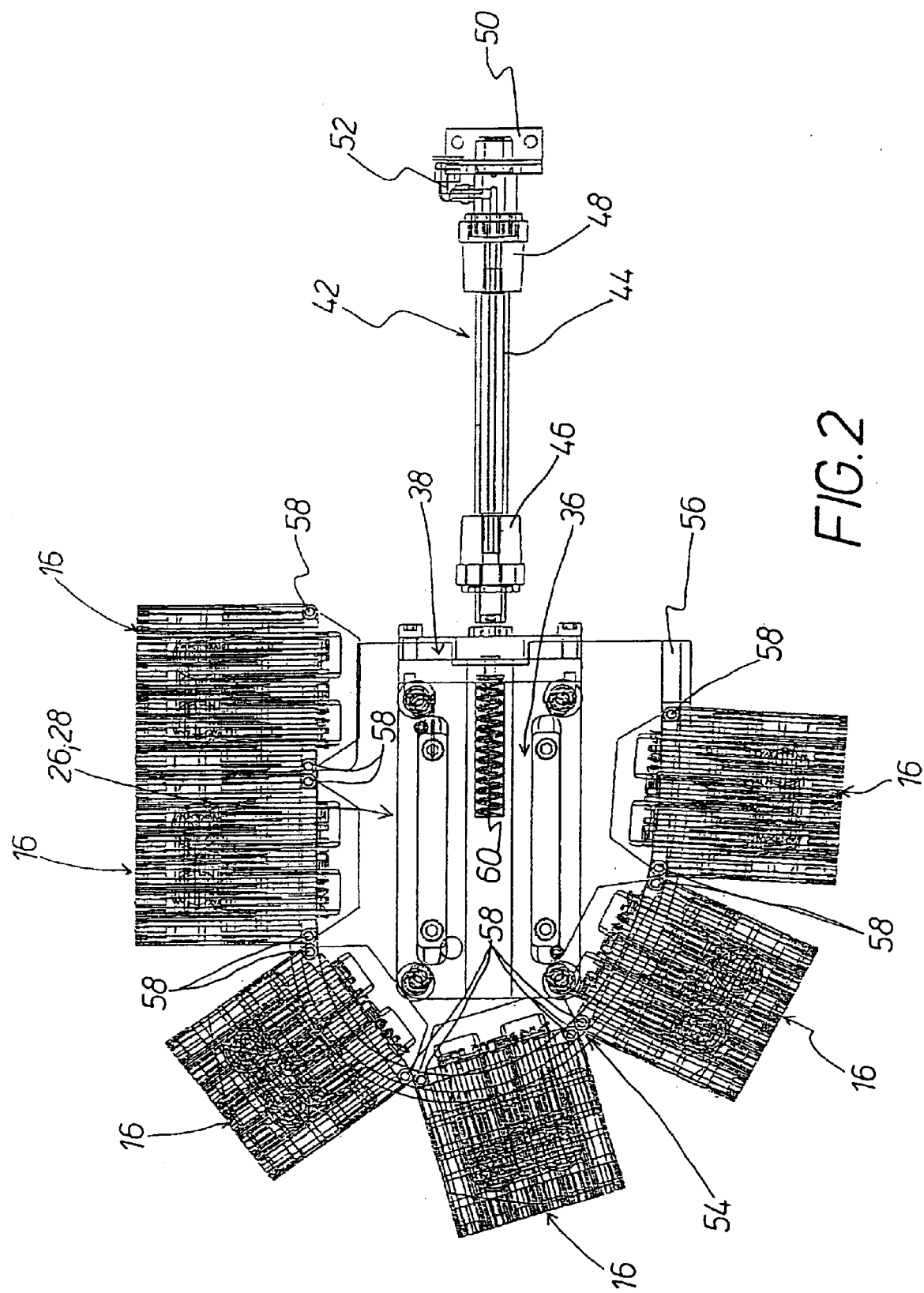
Figure 3:
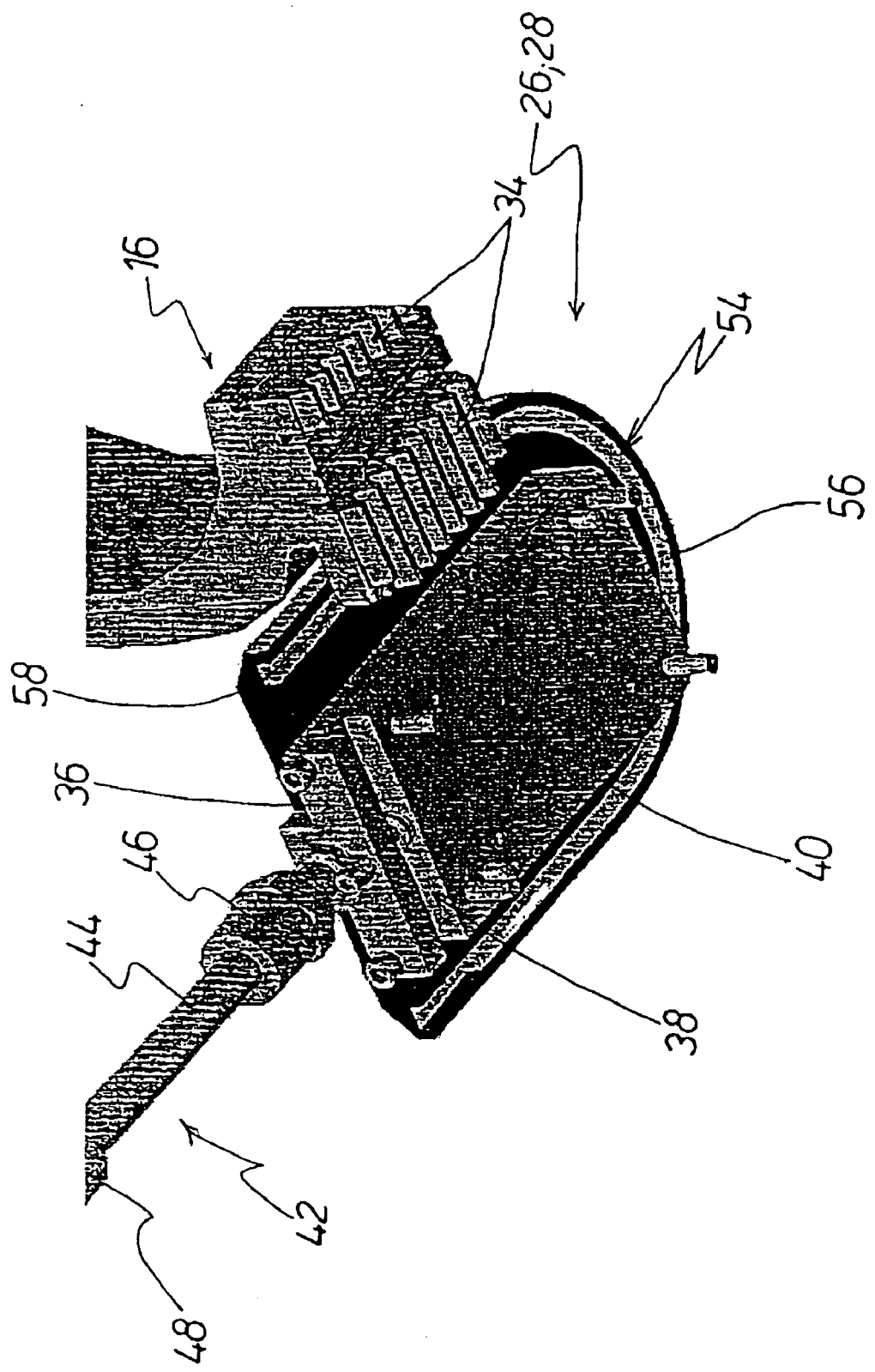

An embodiment of the apparatus according to the invention and essential details thereof are described hereinafter and illustrated in the drawing in which:

FIG. 1 is a cut-away view from above showing a configuration of the invention for the production of transversely ribbed tubes, FIG. 2 is a view on an enlarged scale showing a detail of the apparatus of FIG. 1, that is to say a direction-changing member in combination with an associated compensating device and a number of mold jaw halves which bear against each other, and FIG. 3 shows a perspective view of the direction-changing member of FIG. 2 viewing inclinedly from below in combination with the compensating device shown in cut-away form and in combination with a mold jaw half which is also shown in cut-away form.

FIG. 1 shows an embodiment of the apparatus 10 for the production of transversely ribbed tubes. The apparatus 10 has a base arrangement 12 with two endless guide paths 14, along which mold jaw halves 16 are moved in a circulatory movement, in a condition of bearing against each other. FIG. 1 shows only two of those mold jaw halves 16. The two guide paths 14 have a common mold section 18 and a respective return section 20. The common mold section 18 and the respective associated return section 20 are respectively connected by two direction-changing sections 22 and 24. The direction-changing sections 22 each have a respective direction-changing member 26 and the direction-changing sections 24 each have a respective direction-changing member 28.

The mold jaw halves 16 which bear snugly against each other along the respective guide path 14 are driven by means of a drive device 30. The drive device 30 has gears 32 meshing with a tooth arrangement 34 (see FIG. 3) provided at the underside of the respective mold jaw halves.

The respective direction-changing member 26 and 28 is fixed to a displacement element 36 which is linearly movably guidedly mounted to a base element 38 which is fixed with respect to the machine, as can be seen from FIG. 3. The linear mobility of the displacement element 36 in relation to the base element 38 which is fixed with respect to the machine is indicated by the double-headed arrow 40 in FIG. 3.

The displacement element 36 and consequently the respectively associated direction-changing member 26 and 28 are connected to a compensating device 42. A tolerance play in respect of the mold jaw halves 16 as they circulate along the associated guide path 14, such tolerance play being dependent on the temperature and/or the speed of the mold jaw halves, is automatically compensated by means of the compensating device 42 so that there is no need for the direction-changing members 26 and 28 respectively to be manually re-adjusted, which is a time-consuming procedure, in order to provide a corresponding compensation effect.

The respective compensating device 42 is formed by an air spring 44. The air spring 44 has a first connection fitting 46 and a second connection fitting 48. The air spring 44 is connected to the displacement element 36 with the first connection fitting 46. The second connection fitting 48 is connected to a bracket 50 fixed with respect to the machine. The second connection fitting 48 has a compressed air connection 52. The compressed air connection 52 can be connected to a compressed air source (not shown) in order to act on the air spring 44 with compressed air at a defined increased pressure. That provides for corresponding contraction of the air spring 44 between its connection fittings 46 and 48, that is to say a defined displacement and bracing of the first connection fitting 46 towards the second connection fitting 48 which is fixed with respect to the machine.

The respective direction-changing member 26 or 28 preferably comprises a low-wear plastic material which has oil inclusions in order to minimize the friction of the mold jaw halves 16 along the respective direction-changing member 26 and 28 respectively.

The respective direction-changing member 26 and 28 has a clothold-like guide edge 54 in order to prevent a jump movement of the mold jaw halves 16 in the transitional region between the respective straight return section 20, the respective direction-changing member 26 and 28 and the common straight mold section 18. The clothoid-like guide edge 54 is formed by a clothold-like guide channel 56 which is provided in the respective direction-changing member 26 and 28 at the underside thereof. The respective mold jaw half 16 has two guide rollers 58 which are play-free adapted to the guide channel 56 of the respective direction-changing member 26 and 28 respectively.

As can be seen from FIG. 2, also provided between the base element 38 which is fixed with respect to the machine, and the displacement element 36 of the respective direction-changing member 26 and 28, is a spring element 60 which forms a part of the compensating device 42.

The same features are denoted in each of FIGS. 1 through 3 by the same references so that there is no need for all features to be described in detail with reference to each of those FIGS.

What is claimed is:

1. An apparatus for the production of transversely ribbed tubes, comprising:
   mold jaw halves which are circulatingly movable in a condition of bearing against each other along two guide paths by means of a respective associated drive device, wherein the two guide paths have a common mold section, a respective return section and two respective direction-changing sections, wherein the respective direction-changing section has a direction-changing member provided with an arcuate guide edge for the mold jaw halves;
   wherein the respective direction-changing member comprises a low-wear plastic material and is linearly movably guidedly arranged on a base element fixed with respect to the apparatus and is connected to a compensating device which is compensating for a tolerance play, which is dependent on the temperature and/or the speed of the mold jaw halves, which circulate along the associated guide path wherein the respective direction-changing member is provided with a clothoid-like guide edge for the associated mold jaw halves.

2. The apparatus as set forth in claim 1, wherein the compensating device has an air spring which can be subjected to the action of compressed air.

3. The apparatus as set forth in claim 1, wherein the plastic material has oil inclusions.

* * * * *